March 22, 1949.  A. J. LALIBERTE  2,464,817
STOVE FOR BURNING SOLIDIFIED NORMALLY
LIQUID HYDROCARBON FUEL
Filed July 1, 1943  4 Sheets-Sheet 3

INVENTOR.
ALBERT J. LALIBERTE
BY Louis Burger
Atty.

Patented Mar. 22, 1949

2,464,817

UNITED STATES PATENT OFFICE 2,464,817

STOVE FOR BURNING SOLIDIFIED NORMALLY LIQUID HYDROCARBON FUEL

Albert Joseph Laliberte, Naugatuck, Conn., assignor to Safety-Fuel Incorporated, West Cheshire, Conn., a corporation of Connecticut Application July 1, 1943, Serial No. 493,057

3 Claims. (Cl. 126—43)

This invention relates to new and useful improvements in stoves for burning solidified normally liquid flammable hydrocarbon fuel.

In stoves designed for burning solidified normally liquid flammable hydrocarbon fuel, the fuel is normally contained in a fuel receptacle which is in fuel-vapor feed communication with the combustion space of the stove. The fuel is vaporized and the fuel vapors, appropriately mixed with air, are combusted in the combustion chamber. The vaporization of the fuel is, as a rule, accomplished by conducted heat passing from the combustion chamber to the receptacle. It has been hitherto impossible to variably control the heat output of such stoves.

One object of the invention comprises, inter alia, a manually variable heat control for stoves of the solidified normally liquid flammable fuel burning type, permitting manually variable adjustment of the heat output of such stove by way of controlling conducted heat passed to the fuel receptacle.

The variable heat control in accordance with the invention essentially comprises a fuel receptacle in fuel-vapor feed communication with the combustion space of said stove and having at least part of its walls composed of heat conductive material, first means for conducting heat to said heat conductive wall-part, second means for passing conductive heat from such combustion space to said first means, and third means for variably adjusting the amount of conducted heat so passed.

Within the preferred embodiment of the invention, I provide a first heat conductor for passing conducted heat to the receptacle, a further or second heat conductor for passing conducted heat to the first conductor and so position the first and second conductors that they are movable relative each other for variable area heat conducting contact therebetween; the second conductor is in heat conductive communication with said combustion space and suitable manually adjustable control means provide for the relative variable area movement between the first and second conductor. The first heat conductor referred to may be defined by part or all of the receptacle itself or alternatively, may be defined by auxiliary means mounted at least partly around the fuel receptacle in heat conducting contact therewith. The heat conductive communication between the combustion space and the second heat conductor may comprise any heat conducting or series of heat conducting connections such as any direct or auxiliary parts or sections of the burner assembly construction establishing a heat conductive connection therebetween, as, for instance, one of the walls of the combustion chamber or suitable extension thereof. Relative movement of the first and second heat conductors for variable area heat conducting contact therebetween may be either by way of movement of either conductor with the other stationary or by way of countermovement of both conductors.

The invention will be more fully understood from the following description read in conjunction with the drawings, in which.

Figure 1:
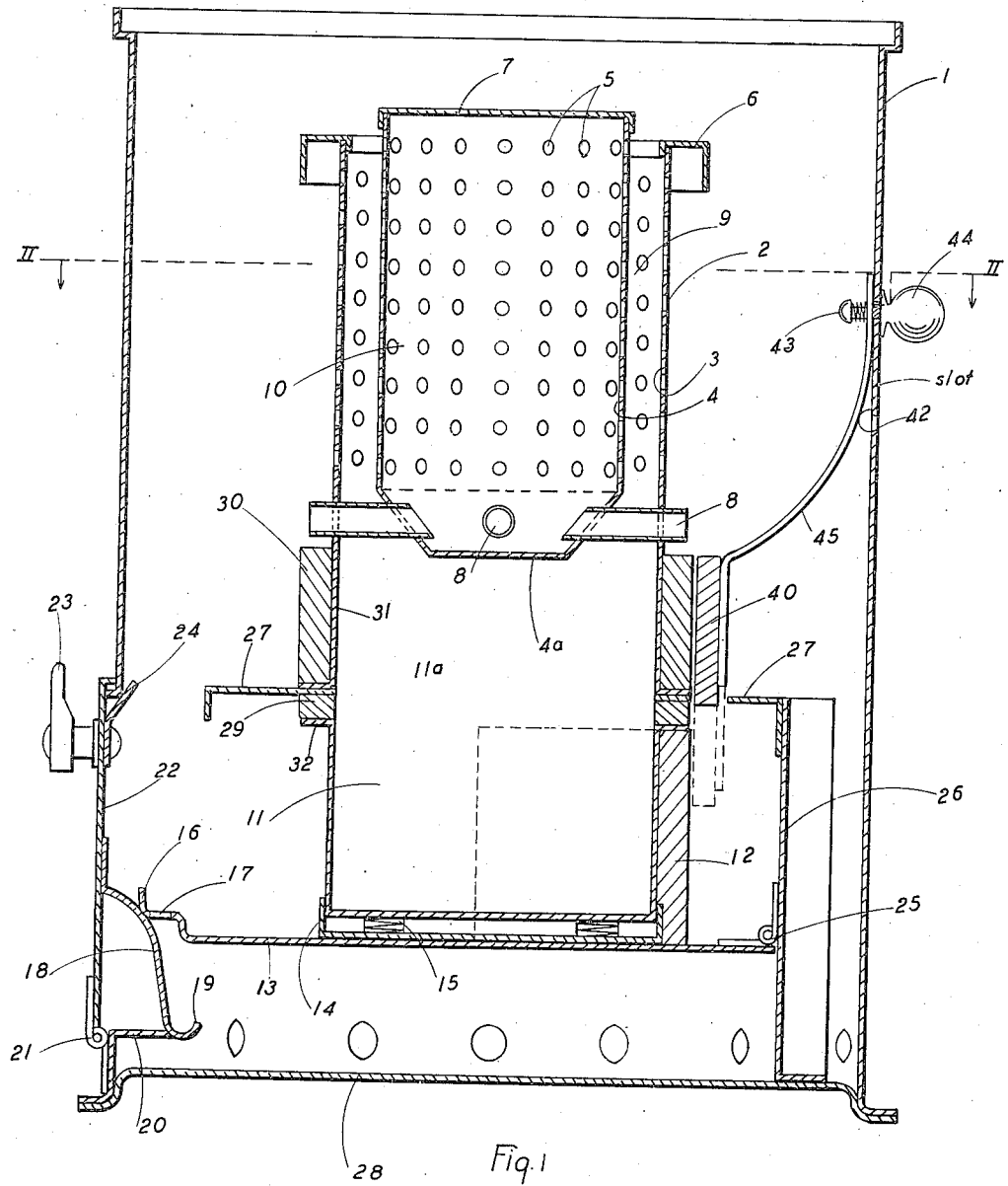
Figure 1 represents a cross-sectional side view of a stove construction illustrating one embodiment of the invention.

Referring to the drawings, 1 designates the stove housing and 2 the burner assembly of the stove. The burner assembly essentially comprises an outer cylinder 3 and, substantially coaxial therewith, an inner cylinder 4, defining therebetween the combustion space or chamber 9. Cylinders 3 and 4, preferably of sheet metal, are provided with the perforations 5. The space or chamber 10 serves as an air distributing chamber, supplied with air through the airducts 8. Inner air distributing chamber 10 is closed with a cap 7. The lower portion of the cylinder 4 converges toward the closed bottom 4a. An annular cap 6 is secured to outer cylinder 3 so as to form an annular outward overhang. Fuel receptacle 11 is in direct open communication, i. e., fuel-vapor feed communication with the combustion space or chamber 9.

Figure 2:
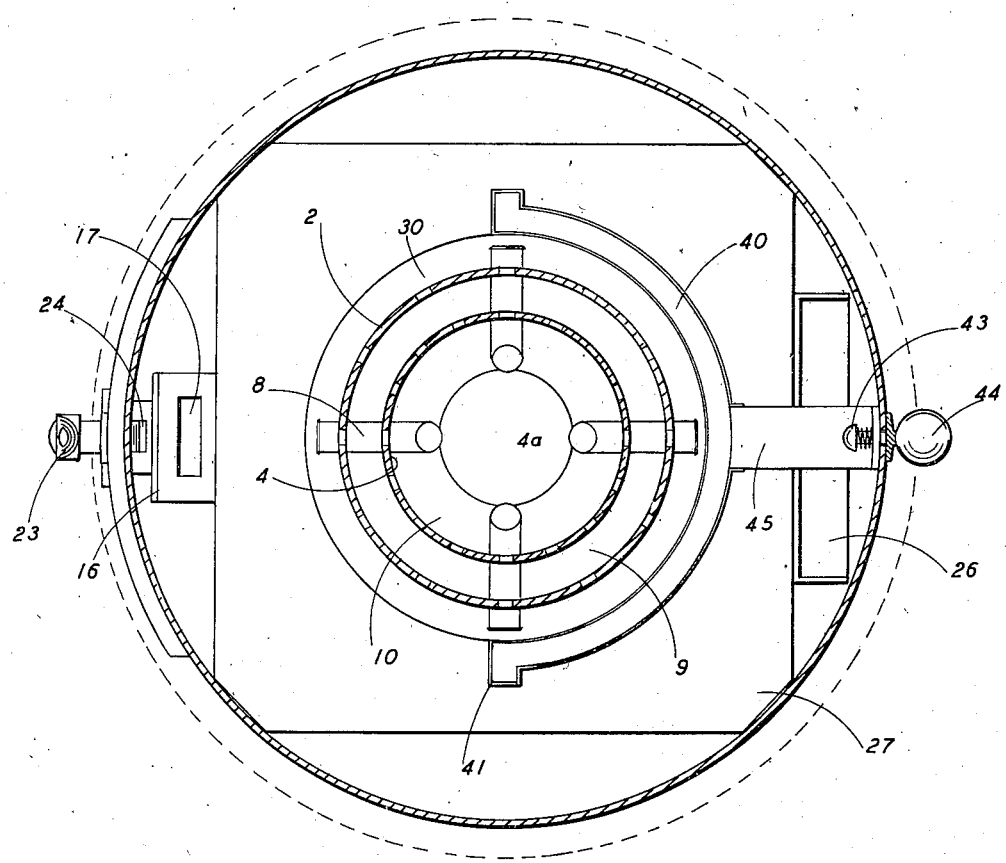
Figure 2 is a cross-sectional top view of the construction shown in Figure 1 on the plane II—II thereof.

Specifically referring to Figures 1 and 2, illustrating one embodiment of the invention, fuel receptacle 11 is removably mounted on springs 15, carried in tray 14 which is secured to the bottom shelf 13 hinged at 25 to the support 26. Support 26 is in turn secured to the burner assembly platform 27 carried by housing 1 and to the base 28 of housing 1. Bottom shelf 13 is provided with a cam rider 16 positioned to ride on the cam surface 18 when opening door 22 which is provided with handle 23 and snap-hook 24. Slot 17 in bottom shelf 13 will be engaged by hook 19 when door 22 is fully opened so as to act as a stop against further downward movement of shelf 13. Door 22 is hinged at 21 and the cam surface 18 is secured to housing 1 by means of angle bracket 20. When opening door 22 rider 16 guided by cam surface 18 will cause shelf 13 to be lowered, thereby permitting removal of fuel cup 11 for replacement or re-charging as the case may be.

Ring 30 of heat conductive material is secured to extended portion 31 of cylinder 3 forming the outer wall of combustion chamber or space 9. A ring 29 of heat insulating material is interposed between ring 30 and the fuel cup 11. Fuel cup 11 has a flanged portion or rim 32 held snugly against insulating ring 29 by the force of springs 15. The insulating material of ring 29 is preferably so selected or treated that a substantially vapor-tight seal is achieved between the fuel cup and the insulating ring. Care should be taken that also the walls of fuel vapor chamber 11a and all joints therein are substantially fuel vapor tight. Semi-ring section 12 of heat conductive material is secured to shelf 13 for snug heat conductive contact with fuel receptacle 11. By reason of its semi-circular configuration, ring section 12 permits removal of the fuel receptacle 11. A semi-cylindrical ring 40 mounted for slidable contact movement of its inner surface over the outer surface of rings 29 and 30 and of semi-ring 12, is guided by guides 41 carried by platform 27. Movement of semi-ring 40 is manually controllable by way of manual control knob 44 carrying spring-adjustable bolt 43 slidable in slot 42 and secured to semi-ring 40 by way of connecting rod 45.

In the practical operation of the embodiment illustrated in Figures 1 and 2, the heat generated in combustion chamber 9 is conducted by way of the perforated metal cylinder 3 and its extension 31 to the heat conductive metal ring 30 and thence to the semi-circular heat conducting metal slide ring 40. In the position illustrated in Figure 1, semi-circular metal ring 40 is not in contact with the heat conductive metal ring section 12 fitted to fuel receptacle 11. No heat is therefore conducted to the fuel receptacle and thus no conducted heat is available for vaporization of fuel. When slide ring 40 by way of manual control knob 44, bolt 43 in slot 42 and connecting rod 45, is moved downwardly as, for instance, to the position shown in dotted outline in Figure 1, progressively larger areas of the heat conducting slide ring 40 will come into contact with progressively larger areas of heat conducting ring section 12. The larger the area of contact between ring sections 40 and 12, the higher is the amount of conducted heat passed to ring section 12, and thus to the fuel receptacle 11, making the same there available for vaporization of fuel contained therein. In this manner, it is possible to variably control the amount of conducted heat passed from the combustion space or chamber to the fuel receptacle and thus to thereby control the amount of fuel vapors available for combustion.

Figure 3:
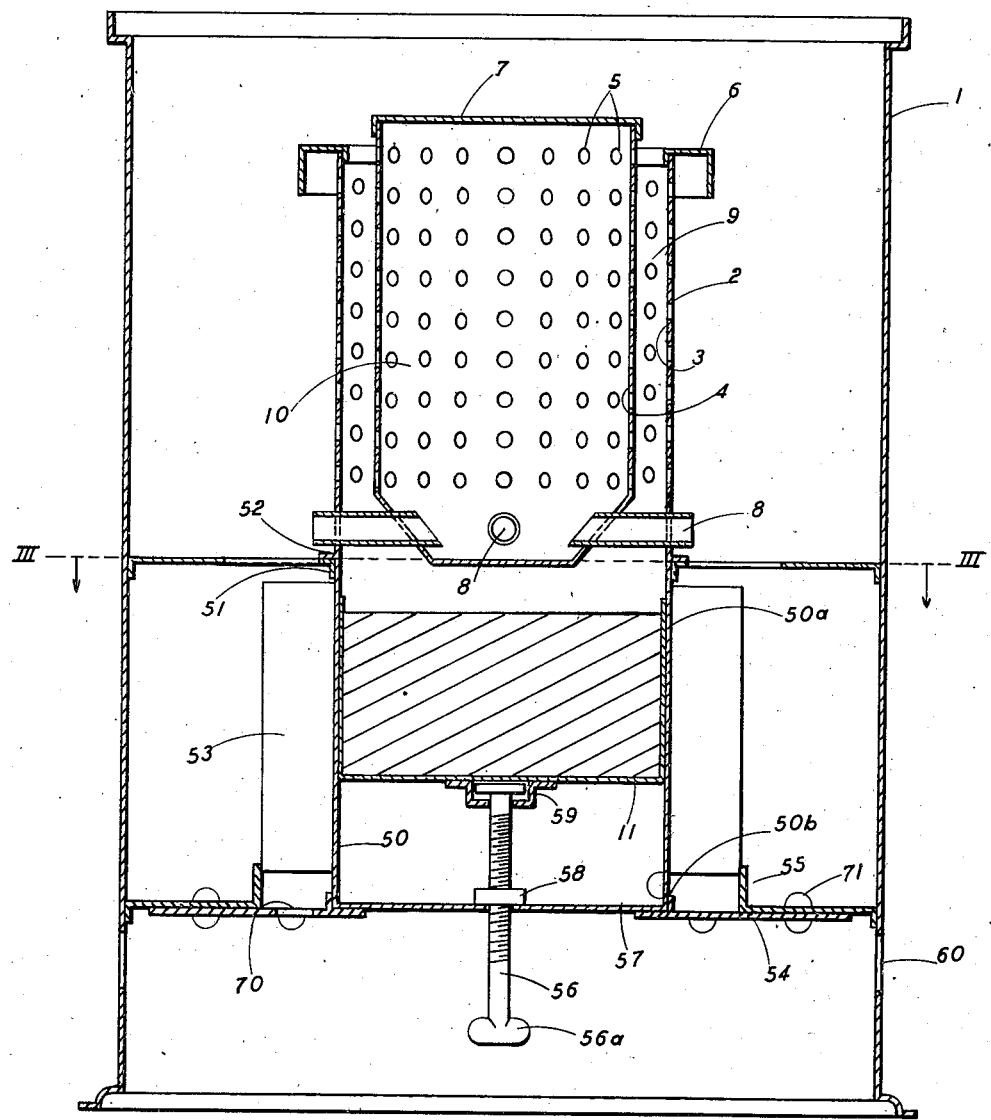
Figure 3 is a cross-sectional side view of a stove construction showing an alternative embodiment of the invention.
Figure 4:
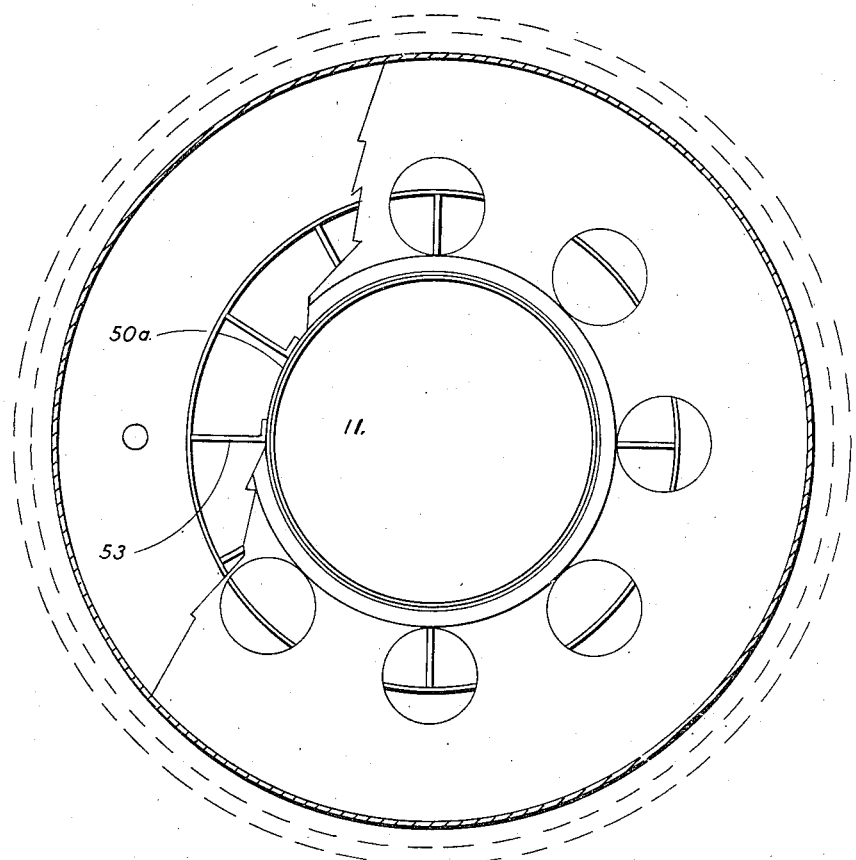
Figure 4 illustrates a cross-sectional top view of the construction shown in Figure 3 on the plane III—III thereof with parts broken away.

Specifically referring to Figures 3 and 4, representing an alternative embodiment of the invention, fuel receptacle 11 is slidably mounted in a slip tube 50, snugly fitted by way of struts or angle brackets 51 to the flanged portion 52 of the outer perforated cylinder 3 of combustion space or chamber 9. Slip tube 50 is provided with fins 53 and held in position by the spring hasps 54 and angle brackets 55 engaging the fins 53. A screw assembly 56 running through the bottom 57 of slip tube 50 by way of the inner threaded female section 58 is freely rotatable, by means of screw head 56a, inside screw head housing 59 secured to the bottom of the fuel receptacle 11. Stove housing 1 carries adjacent bottom thereof air ports 60 and has an open bottom.

In the practical operation of the construction illustrated in Figures 3 and 4, heat is conducted from the cylinder 3 forming the outer wall of the combustion chamber or space 9 to the upper portion 50a of slip tube 50. As the result of the burner draft, air, sucked in through air ports 60, passes through the openings 70, directed and aided by the fins 53, upwards along the outer surface of slip tube 50. There is thus created a counter-current system of downwardly traveling conducted heat and upwardly travelling cooling air with the result that the slip tube is progressively cooler downwardly. There is thus passed to the lower portion 50b of the slip tube such relatively small amount of conducted heat that the same is sufficient for vaporization of fuel in the fuel receptacle. Thus by moving the fuel receptacle 11 between higher and lower positions, it is possible to variably adjust the amount of conducted heat transmitted to the fuel receptacle for vaporization of fuel therein and thus to control the rate of vaporization of fuel and thereby the heat output of the stove.

For the purpose of replenishing or recharging the fuel receptacle, hasps 54 pivotable at 71 may be turned aside and the whole slip tube assembly may be withdrawn through the open bottom of the stove.

The fuel receptacles in stove construction in accordance with the invention may be either charged with the solidified fuel as such or with the solidified fuel in cans or the like. In such case, of course, such cans are preferably of heat conductive material so as to obtain the maximum effect of the heat passed to and available from the fuel receptacle itself.

Wherever herein the term "solidified normally liquid flammable hydrocarbon fuel" or such similar expression is used, I mean thereby any normally liquid flammable hydrocarbon fuel in solid form, regardless of any particular solidification agent or method of solidification and including such fuels as are solidified by congelation in the presence of soaps or with the formation of soap, as well as those as are solidified by adsorption in capillarily porous materials such as suitably porous ceramics or the like.

The foregoing description is furnished by way of illustration and not of limitation and it is, therefore, my intention that the invention be limited only by the appended claims wherein I have endeavored to claim broadly all inherent novelty.

I claim:

1. In a stove for burning solidified normally liquid flammable hydrocarbon fuel and having means defining a combustion space for such stove, the improvement in heat control comprising a fuel receptacle in fuel-vapor feed communication with the combustion space of such stove, a first heat conductor defined by at least part of said receptacle, a slip tube surrounding said receptacle and defining at least in part a second heat conductor, said receptacle being mounted slidable in said tube and said first heat conductor being mounted for slidable contact with said second conductor, means for passing heat from such combustion space to one end of said second conductor and means for sliding said receptacle within said tube toward and away from said end to thereby variably control the amount of conducted heat passed to said receptacle.

2. In a stove for burning solidified normally liquid flammable hydrocarbon fuel and having means defining a combustion space for such stove, the improvement in heat control comprising a fuel receptacle in fuel-vapor feed communication with the combustion space of such stove, a slip tube of heat conductive material and of greater height than said receptacle, said receptacle being slidably mounted in said tube, means for passing heat from such combustion space to one end of said tube, means for cooling the other end of said tube, and means for adjustably sliding said receptacle between the ends of said tube to thereby variably control the amount of conducted heat passed to said receptacle.

3. In a stove for burning solidified normally liquid flammable hydrocarbon fuel and having means defining a combustion space for such stove, the improvement in heat control comprising a fuel receptacle in fuel-vapor feed communication with the combustion space of such stove, a slip tube of heat conductive material defined by a downward extension of one of the limiting walls of such combustion space and being of greater height than said receptacle, said receptacle being slidably mounted within said tube in heat conductive engagement therewith, means for passing a current of cooling air to the lower end of said tube and upwardly along its outer surface, and manually adjustable means for variably sliding said receptacle to positions between the ends of said tube.

ALBERT JOSEPH LALIBERTE.

REFERENCES CITED

The following references are of record in the file of this patent:

UNITED STATES PATENTS

| Number | Name | Date |
|---|---|---|
| 316,385 | Myers, et al. | Apr. 21, 1885 |
| 445,692 | Devoe | Feb. 3, 1891 |
| 993,412 | Ryckman | May 30, 1911 |
| 1,160,894 | High, et al. | Nov. 16, 1915 |
| 1,254,019 | Ball | Jan. 22, 1918 |
| 1,300,594 | Ferdon | Apr. 15, 1919 |
| 1,879,954 | Smith | Sept. 27, 1932 |
| 1,879,955 | Smith | Sept. 27, 1932 |
| 1,995,049 | Zeitz | Mar. 19, 1935 |

FOREIGN PATENTS

| Number | Country | Date |
|---|---|---|
| 580,829 | France | Sept. 11, 1924 |